(No Model.) 4 Sheets—Sheet 1.

H. J. LIORET.
PHONOGRAPH.

No. 528,273. Patented Oct. 30, 1894.

Witnesses:—
Fred'k Haynes
George Barry

Inventor:
Henri Jules Lioret
by attorneys
Brown & Seward (No Model.) H. J. LIORET. 4 Sheets—Sheet 2.
PHONOGRAPH.
No. 528,273. Patented Oct. 30, 1894.
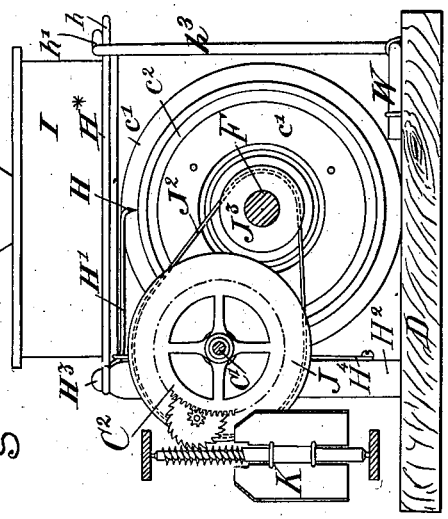
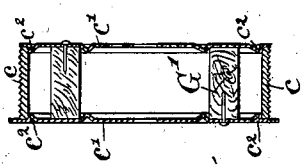
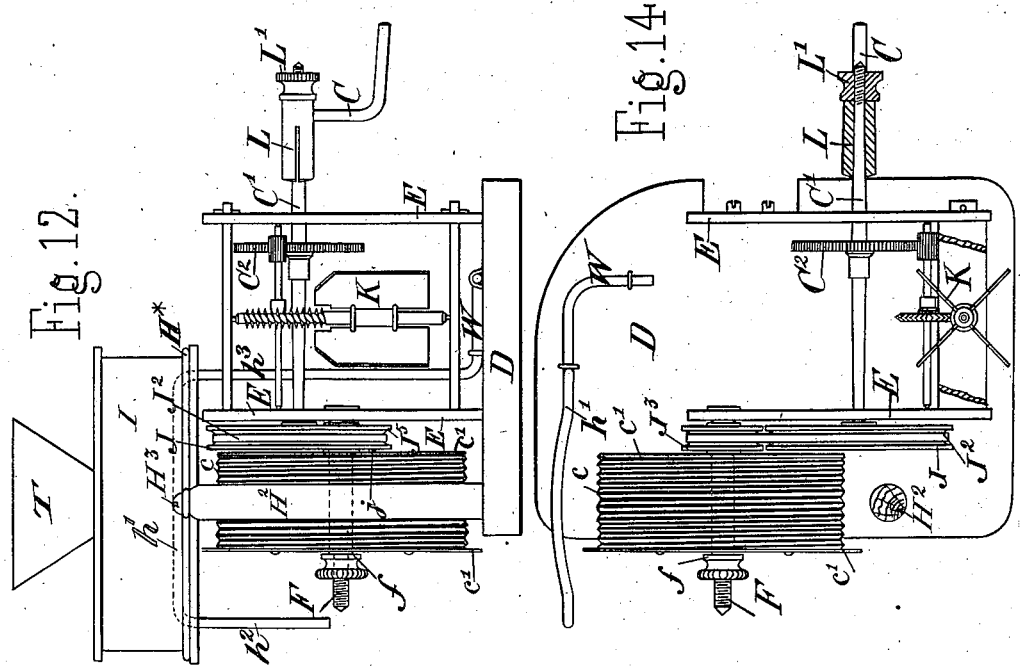
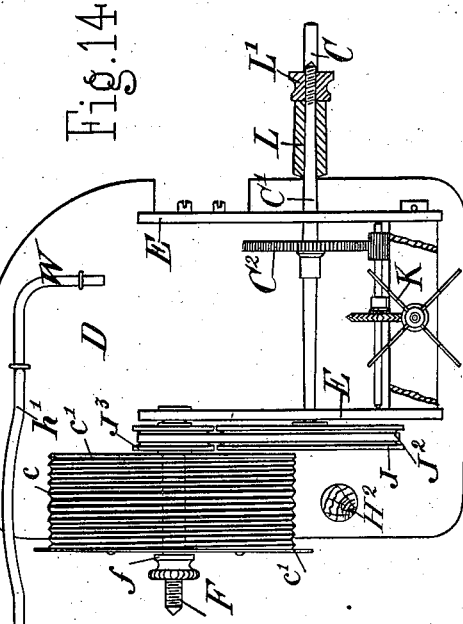
Witnesses:—
Frud Haynes
George Barry.
Inventor:—
Henri Jules Lioret
by attorneys
Brown & Seward (No Model.) 4 Sheets—Sheet 3.

H. J. LIORET.
PHONOGRAPH.

No. 528,273. Patented Oct. 30, 1894.

Witnesses:—
Jno. T. Haynes
George Barry.

Inventor:—
Henri Jules Lioret
by attorneys (No Model.) 4 Sheets—Sheet 4.

H. J. LIORET.
PHONOGRAPH.

No. 528,273. Patented Oct. 30, 1894.

Witnesses:—
Fred T Haynes
George Barry

Inventor:—
Henri Jules Lioret
by attorneys
Brown & Seward

UNITED STATES PATENT OFFICE.

HENRI JULES LIORET, OF PARIS, FRANCE.

PHONOGRAPH.

SPECIFICATION forming part of Letters Patent No. 528,273, dated October 30, 1894.

Application filed December 20, 1893. Serial No. 494,179. (No model.) Patented in France May 18, 1893, No. 230,177.

*To all whom it may concern:*

Be it known that I, HENRI JULES LIORET, of Paris, in the Republic of France, have invented a new and useful Improvement in Phonographs, (for which I have obtained a brevet d'invention of the Republic of France, No. 230,177, dated May 18, 1893,) of which the following is a specification.

The object of my invention is to construct phonographs at a low price and consequently to provide for their application to very numerous purposes, such for instance, as the manufacture of new toys.

My invention relates in the first place to the construction of the cylinder or roller intended to receive the impressions of the recording style which is carried by the vibrating plate, diaphragm or membrane which is spoken against, whereby the said cylinder, when engraved or impressed, may be used as a matrix to reproduce a great number of times the same impressions upon other cylinders which I call reproduction cylinders.

The improvement also relates to the mode of mounting or setting up these reproduction cylinders; also to the arrangement of the receiving style and of the resonant box or resonator to which the said style is adapted; and further to the motor mechanism of the phonographic apparatus.

Figure 9:
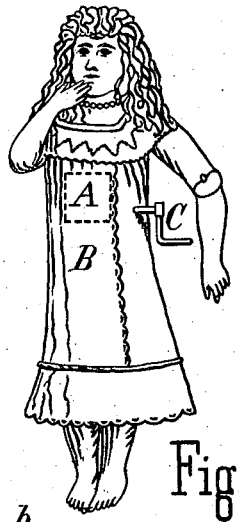
Figure 10:
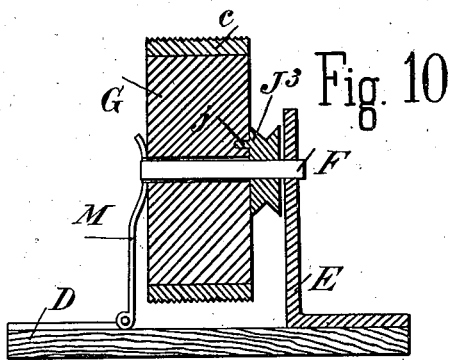
Figure 1:
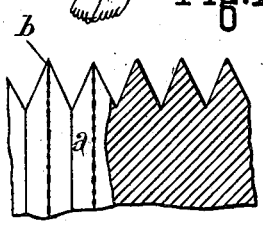
Figure 2:
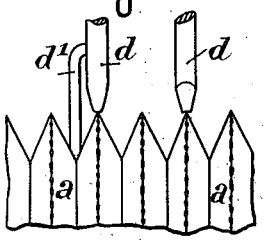
Figure 3:
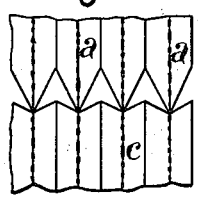
Figure 4:
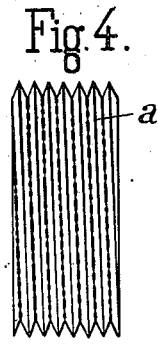
Figure 15:
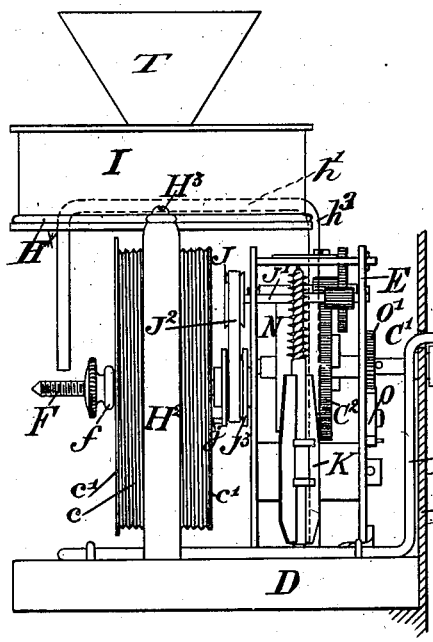
Figure 16:
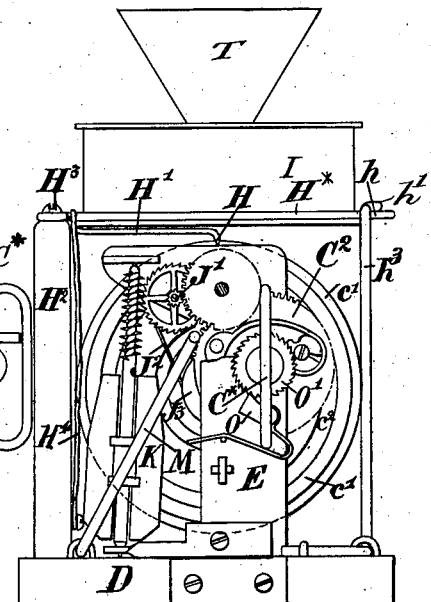
Figure 17:
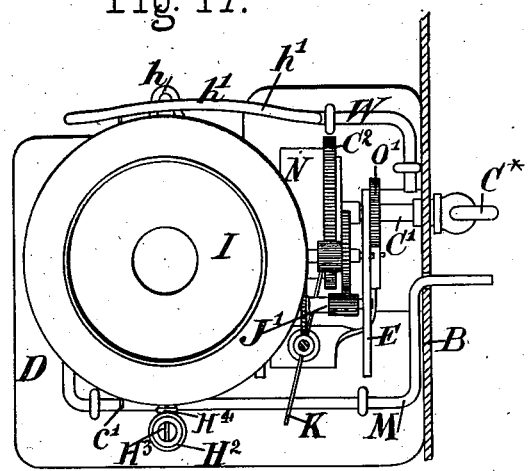
Figures 18, 19:
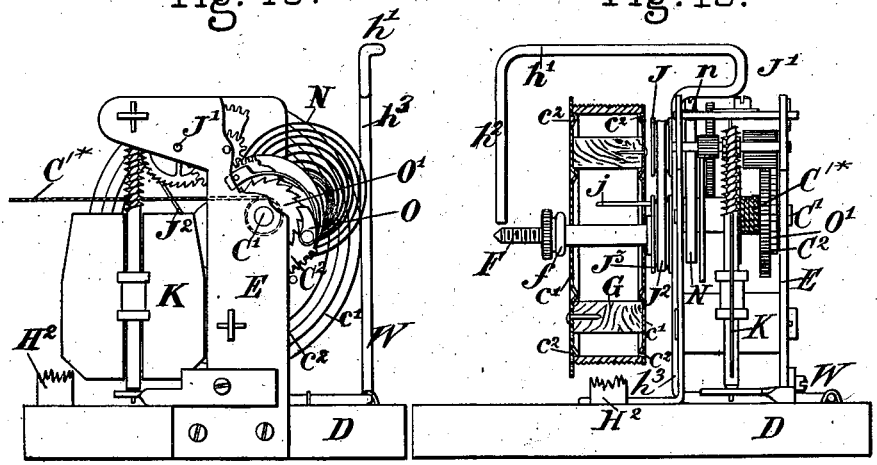
Figure 20:
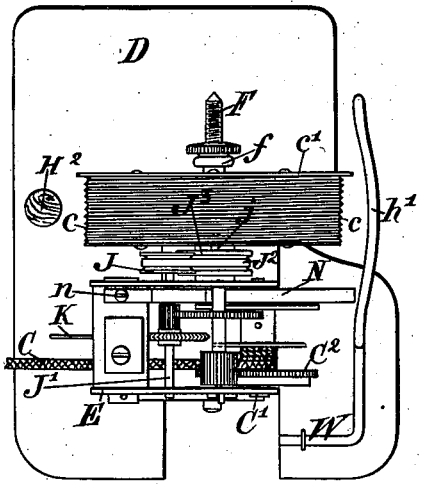

In the accompanying drawings Figure 1 is a profile view of part of a matrix cylinder. Fig. 2 is a similar view showing the mode of guiding the style upon the fillets of the matrix cylinder. Fig. 3 is a similar view of part of the matrix cylinder and of the reproduction cylinder which may be obtained from it. Figs. 4 to 8 represent successive stages of the manufacture of a reproduction cylinder of celluloid and will be hereinafter more particularly described. Fig. 9 represents a doll furnished with my apparatus. Fig. 10 is a sectional view representing one way of mounting the cylinders of my system. Fig. 11 is a similar view showing another mode of mounting my cylinders. Figs. 12 and 13 represent elevations at right angles to each other, Fig. 13 being partly in section, of one example of a complete apparatus embodying my invention. Fig. 14 is a plan view partly in section, corresponding with Figs. 12 and 13. Figs. 15 and 16 represent elevations at right angles to each other, Fig. 16 being partly in section, of a second example. Fig. 17 is a plan view corresponding with Figs. 15 and 16. Figs. 18 and 19 represent elevations at right angles to each other, Fig. 19 being partly in section, of a third example. Fig. 20 is a plan view corresponding with Figs. 18 and 19.

Similar letters of reference designate corresponding parts in all the figures.

The matrix cylinders are obtained in the following manner: I take a sleeve or hollow cylinder of soft steel having on its outer circumference a thread with triangular cross-section of suitable fineness and place it in front of the recording style attached to the vibrating plate or diaphragm which is spoken against, so arranging the said sleeve and style that the point of the style engraves its impressions successively along the top angle of the thread; this being where the resistance to penetrate is the least, first because of the slight thickness of metal presented and second, by reason of the absence of lateral contact or friction due to contiguous surfaces because such surfaces do not exist in the neighborhood of the top angle of the thread; where the style may act with more efficacy and cut in a suitable manner in the sharp edge the impressions which are to be left upon the cylinder.

To receive the impression of the sonorous vibrations the threaded sleeve or cylinder is keyed upon an arbor which is terminated by a screw of the same pitch engaged in a nut. In front of the cylinder or sleeve thus mounted I arrange any appropriate phonographic recording apparatus—for example a vibrating membrane furnished with a style, taking care that the style bears upon the angle of the thread of the cylinder. If then the arbor is set in motion, the cylinder turns in front of the style and if one speaks against the membrane the style will engrave along the angle of the thread impressions of form and depth corresponding with the nature of the sonorous vibration. The cylinder being thus engraved I temper it and thus obtain a cylinder which may be employed to produce the vibration of the membrane of the receiver and reproduce sounds which have been made in front of it.

The first part of my invention is indicated in Fig. 1 which represents an elevation and section of portions of the threaded cylinder showing the impressions b cut in the angle of its thread by the recording style.

When the matrix cylinder a is employed directly to make the receiver speak, the receiving style d, of which the blunt point should rest upon the angle of the thread as shown toward the left of Fig. 2, bears upon an additional lateral point d', which is engaged in the groove of the thread in such manner as to be guided by it and to produce naturally the advance both of itself and of the receiving style without which there would be necessary for the latter a screw or other mechanism of some kind or other corresponding with the thread of the cylinder. There might also be employed a style with a point broadened and hollow in the form of a crescent in such manner as to embrace the angle of the thread and yet only rest upon it by a point as shown toward the right hand of Fig. 2. It has been mentioned how the cylinder engraved upon the angles of its thread and then tempered may be employed directly to produce the speech of the receiver; its great hardness assuring it the advantage, quite new, of great durability; but it may also, as I have said, serve as a matrix or as a rowel utilizable to produce directly a great number of times and consequently in a very economical way upon other cylinders of soft metal or other suitable material, impressions which will enable them to be used to put in vibration the membrane of the receiver. These are the new cylinders which I have designated under the name of reproduction cylinders.

When it is desired to obtain a cylinder of soft metal or other analogous material it may be done directly by simply causing the matrix to roll under a suitable pressure upon a cylinder of the same diameter in such manner as shown in Fig. 3, or else upon a ribbon of suitable profile which may be afterward enrolled upon a roller. The reproduction cylinder has preferably a thread of the same pitch as that of the matrix cylinder in order that the impressions engraved upon the angle or top of the thread of the latter may be reproduced in the bottom of the thread of the reproduction cylinder as shown in Fig. 3. The ribbon may also present striations or grooves which, when it is enrolled upon its roller, will constitute a threading. In this case the impressions are also reproduced at the bottom of these striations or grooves. In fact these impressions will be counterparts of those of the matrix cylinder, but that is without importance from the point of view of the reproduction of the sounds.

It is hardly necessary to remark that when use is made in the receiver of the reproduction cylinder c like that which has just been described, the receiver style may be guided very simply by making its point bear on the bottom of the cavity of the thread.

It may be remarked (see Fig. 3) that the threading of the reproduction cylinder c is not so deep as that of the matrix cylinder a in order to facilitate the reproduction. This threading only needs to be deep enough for the guidance of the style.

When the reproduction cylinders are not required to be so durable, instead of making them of soft metal or other analogous matter, they may be made of celluloid. This material presents the advantage of well preserving the impressions, not being liable to break and above all not being sensibly influenced by atmospheric variations. Moreover, besides being homogeneous and very hard, they cut and mold sharply and they wear well.

Figure 5:
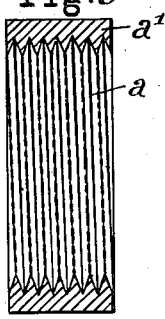
Figure 6:
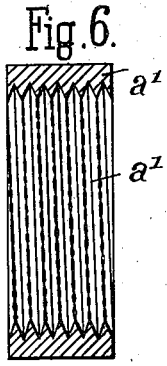
Figure 7:
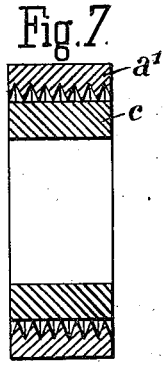
Figure 8:
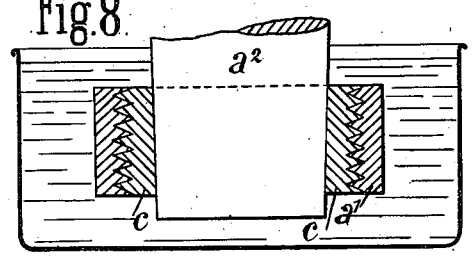

To produce the cylinders of celluloid, I operate as follows: I prepare the matrix cylinder a (Fig. 4) as I have hereinbefore described. Then I take upon it as is shown in Fig. 5, a galvano-plastic mold a' which presents consequently the form of a tube having in its internal surface the counterpart of the threading and the impressions of the matrix cylinder a. (See Fig. 6.) I remove this tube from the matrix cylinder by first heating it externally to expand it sufficiently to enable it to be unscrewed from the said cylinder, the impression being so slight that very little expansion is necessary. After its removal I introduce into the said tube a sleeve or ring c of celluloid (see Fig. 7) just large enough to enter it freely, then plunge the whole into hot water. The celluloid is thus softened, and I then introduce forcibly into the said collar or ring c a mandrel $a^2$ sufficiently large to dilate the said ring or collar and cause it to penetrate into all the cavities of the mold a' as shown in Fig. 8. I then plunge the whole into cold water and the celluloid recovers its hardness and is at the same time generally contracted sufficiently to permit the easy withdrawal of the ring c from the mold a' by unscrewing it therefrom. If, however, the contraction of the ring c in this way is not sufficiently greater than that of the mold a', the mold may be slightly warmed by heat externally applied.

It may be here mentioned that the impression produced by the style on the matrix cylinder and reproduced in reverse in the mold a' is so slight that only a very slight dilation of the ring c is necessary to obtain the impression on it and a very slight contraction to permit it to be unscrewed from the mold a' without damaging said impression.

It may be further mentioned that the threads of the matrix are very fine in practice and are very much exaggerated in the drawings to facilitate the illustration. This ring c thus becomes finally a reproduction cylinder which is an exact reconstitution of the matrix cylinder a. This method is rapid and economical and gives perfect results. It may be understood moreover that according as the impressions have been engraved upon the angle or in the bottom of the thread of the matrix *a*, the cylinder *c* will also have the impressions upon the angle or in the bottom of its thread and that the receiver style should be formed to correspond.

In the following description of examples of my invention I will suppose the phonograph arranged in the body of a doll as shown in Fig. 9, but it will be understood that it is capable of any other application.

For whatever purpose they are to be applied the cylinders *c* obtained by either of the means which I have just described may be fastened upon a cylindrical drum G, made of wood for example, which is fitted to turn freely upon a fixed arbor F. This arbor is carried by a standard E fixed upon a base D as shown in Fig. 10. It also receives a loose pulley $J^3$ carrying a pin *j* which enters into a hole in the drum G in such manner as to drive the cylinder *c*. A hinged spring arm M serves to hold the drum G and cylinder *c* in place upon the arbor but permits their removal therefrom. When the cylinder *c* is of celluloid I prefer to mount it in another way as is shown in Fig. 11, that is to say, to place it between two thin disks *c'* forming jaws and having annular centering projections $c^2$ on their inner faces. These two disks are maintained at a suitable distance apart by a wooden ring G' to which they are nailed. The cylinder *c* thus mounted is placed upon the arbor F, the disks *c'* having central holes which fit the said arbor.

As to the mechanism for driving the cylinder *c*, it may be varied in many ways, but it is characterized in all cases by the fact that the motive power is not applied directly to the arbor F of the said cylinder *c*, but to a driving spindle C' (see Figs. 12 to 20) between which and the said cylinder there is an elastic or yielding power-transmitting device. In the example represented this power-transmitting device consists of an india rubber driving belt $J^2$ running on a driving pulley J on the spindle C' and on the pulley $J^3$ hereinbefore mentioned. The principal advantage of this method of driving is that the elastic belt may allow the driving pulley J to slip a certain distance without letting it go altogether when the cylinder *c*, which has a considerable relative weight, acts as a flywheel to remedy any inevitable inequalities in the speed of the driving spindle C', especially if it is moved by hand.

In my apparatus the blunt pointed receiver style H is affixed to or formed by the extremity of a horizontal arm H' which carries a cylindrical resonance box or resonator I of any suitable material, the style being rigidly fixed under the center of this resonator. The said arm H' is mounted freely upon a pivot $H^3$ carried by a column $H^2$ in such manner that while free to turn on this pivot the ensemble formed by the resonator and the style rests freely upon the cylinder by its own weight and may follow a generatrix of the cylinder in the threading of which the style is always guided as has been previously described. For greater simplicity, the style, the arm which carries it, and the support for the box may be constituted as shown in the drawings, by one and the same metal wire, preferably of steel, which surrounds the base of the resonator, as shown at $H^*$, forms an eye around the pivot $H^3$ and passes under the base of the resonator to form the arm H' the extremity of which is bent down and pointed in such manner as to constitute the style H.

As to the column $H^2$, it is simply placed tightly in a hole in the base D. In order to insure a better contact between the style and the cylinder, the metal wire which carries the resonator and which forms the style is constantly pulled downward by a spring of any suitable kind as an elastic band $H^4$, of which one of the ends is attached to a fixed point. Moreover, the metal wire has formed in it a loop *h* which projects from the resonator and constitutes a guiding arm and which, being guided under a suitably arranged guide *h'*, prevents the resonator I and the style H from being accidentally separated from the cylinder beyond a certain distance, when the apparatus receives a shock for example. The said guide *h'* is represented as formed by the horizontal upper portion of a fixed yoke W made of strong wire and fastened to the base D, which yoke has also two vertical branches $h^2$ and $h^3$. When the resonator in turning about the pivot $H^3$ arrives at the end of its course in one direction or the other, that is to say, when the style has run the entire length of the cylinder, its guiding arm *h* encounters one of the vertical branches $h^2$ $h^3$ of the yoke and prevents the resonator and the style from running any farther. On the other hand, when the apparatus is reversed, the guiding arm *h* coming against the guide *h'* prevents the resonator from being too far separated from the cylinder. Were it not for this guide all the weight of the resonator would be thrown back upon the loop which forms the eye around the pivot $H^3$ at the bending of said loop, thereby disarranging the said apparatus.

The resonator has preferably an opening in its top to receive the end of a trumpet T which facilitates the proper propagation of the sound.

When the cylinder is turned in the proper direction to make the apparatus speak, the style follows freely the thread of the cylinder *c* and when it has arrived at the extremity of the cylinder all that has to be done is to shift it to the other end to make the apparatus repeat its speech.

The phonographic apparatus thus set up may be driven by hand or else by the aid of a clock mechanism. In the apparatus represented in Figs. 12 to 14, the movement is produced by the turning of a hand-crank C. This crank, instead of being keyed upon the spindle C', is carried by a split socket L mounted upon a slightly conical portion of the spindle C'. A nut L' screwed on to the end of the said spindle serves to regulate the tightness and the adhesion between the socket and the spindle.

The spindle C' has geared with it and drives a fly regulator K. The resistance presented by the air to the movement of this fly increases with the speed of the latter, but there is one speed of rotation of the crank C and spindle C' at which this resistance is equal to the adhesive force of the socket L on the spindle C'. If this limitation of speed is passed the resistance opposed to the driving mechanism by the fly K becomes superior to the force of adhesion of the socket L and the latter slides upon the spindle C' which preserves always a constant speed limited to the desired degree.

In the example represented in Figs. 15 to 17 the drum G and cylinder c are driven by a spring clock mechanism which is wound by means of a key C*. In this example the fly regulator K is applied as in the example previously described.

I employ very simple means of starting and stopping the clock movement. This means consists of a movable stop M mounted upon the base D in such manner as to be capable of sliding forward and backward when manipulated by means of a prolongation m suitably guided. When, after the winding, this stop M has been brought to the position indicated in the drawings, the clock movement is permitted to operate because the fly K is allowed to turn freely without encountering the said stop; but on the other hand, the winding is impossible because the key in turning would be arrested by the prolongation m of the stop. If on the contrary, the latter is pushed inward the winding becomes possible but the movement is stopped because the fly in turning would encounter the stop and be thereby stopped.

In the example represented in Figs. 18 to 20 the mechanism is simplified by substituting for the clock movement a simple spring N of which one of the extremities is attached to the fixed pin n and the other is attached to the motor spindle C'. To produce the winding, all that it is necessary to do is to draw a small cord C'* which is enrolled upon a drum keyed upon the spindle C'. The spindle is thus made to turn in the desired direction to wind the spring N. During this movement the transmitting mechanism does not turn because the gear C² is loose upon the spindle C' and the pawl O which is carried by the said gear may slip over the teeth of the ratchet wheel O' keyed upon the said spindle; but when the cord C'* is let go, the spring tends to produce the turning of the spindle C' in a reverse direction. The ratchet wheel O' then drives the gear C² and consequently sets in movement all the transmitting mechanism.

The speed of this movement is also regulated by the fly K.

I have supposed in the example represented as I have hereinabove stated, that the phonographic apparatus was placed in the cavity A provided in the body B of a doll (Fig. 10). It is then arranged in such manner that one may from the exterior operate the crank C or wind the clock movement by means of the key C* or the cord C'*.

One or more of the walls of the cavity A should be very thin and also pierced with holes in order that there may be no obstacle to the propagation of the sound.

What I claim as my invention is—

1. In a phonograph, the combination with a spirally threaded cylinder, a style d having a point which runs on the top of the thread of the said cylinder and an additional guiding point d' engaging in the groove of said thread, substantially in the manner and for the purpose herein described.

2. In a phonograph, the combination with a threaded cylinder and a resonator turning about a fixed pivot and furnished with a style to follow the threading of the cylinder, of a guiding yoke comprising a horizontal portion and vertical branches, and a guiding arm carried by the resonator and engaging under the horizontal portion of said yoke, substantially as and for the purpose herein described.

3. The method of reproducing phonographic cylinders which consists in first obtaining a metal mold by electro-deposit upon an original phonographic cylinder, next placing bodily within the so obtained mold a solid ring of plastic material capable of being softened by heat, next softening this ring by heat, and finally so distending the said ring within said mold by internal pressure that it will receive therefrom an impression corresponding with that of the original cylinder, substantially as herein described.

4. The combination in a phonographic cylinder, of a hollow cylinder c, disks c' having centering projections for said hollow cylinder and a spacing ring G' arranged between said disks and means of securing said disks to said spacing ring, substantially as herein described.

5. The combination with a motor for operating a phonograph, of a driving crank on the main spindle of said motor, an adjustable friction device between said crank and spindle and a rotary fly geared with and driven by said motor, substantially as and for the purpose herein set forth.

In witness whereof I have hereunto set my hand in the presence of two subscribing witnesses.

HENRI JULES LIORET.

Witnesses:
MAURICE MERCIER,
CLYDE SHROPSHIRE.